No. 609,440. Patented Aug. 23, 1898.
L. H. KROMM.
FERTILIZER DISTRIBUTER.
(Application filed June 1, 1897.)
(No Model.) 3 Sheets—Sheet 1.
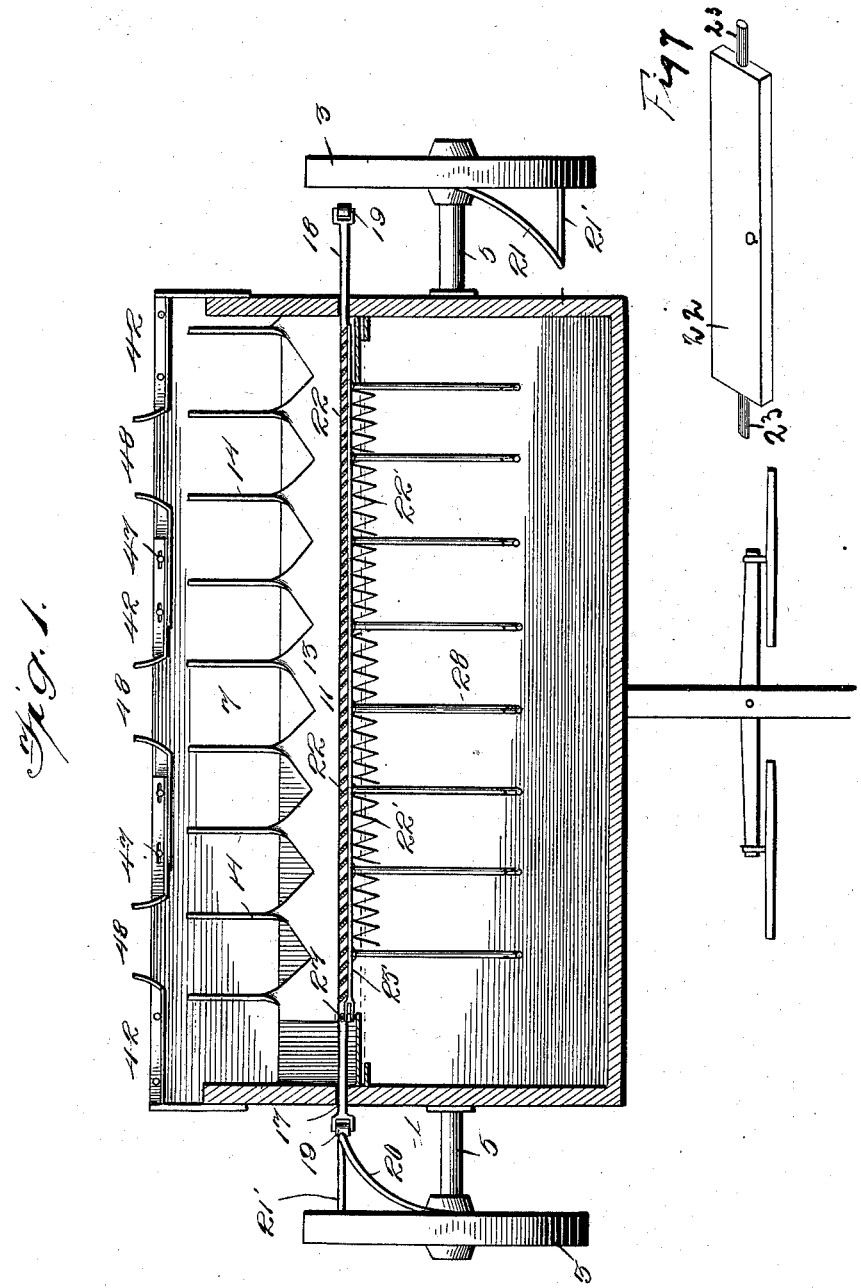
Witnesses
Inventor
Louis H Kromm,
By John Wedderburn. Attorney

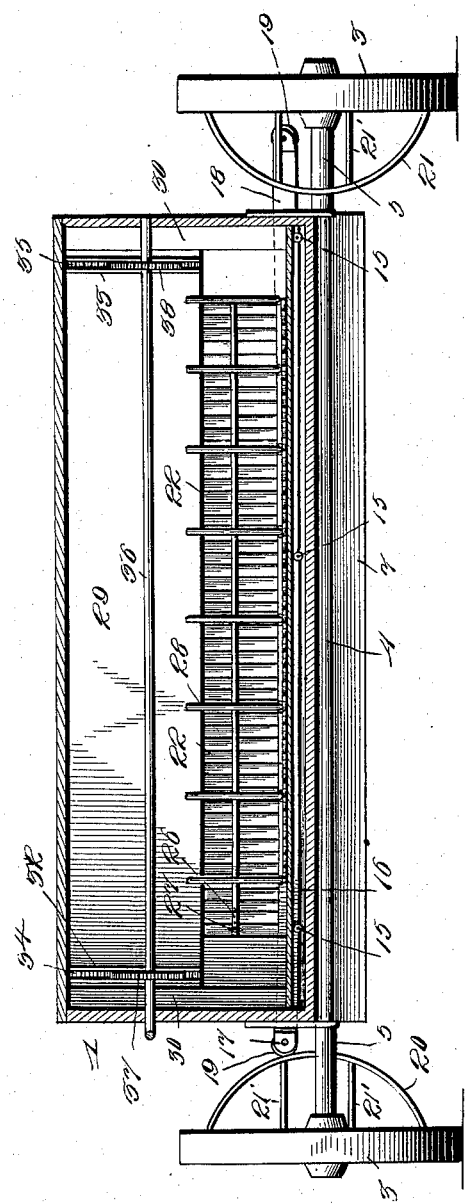

No. 609,440. Patented Aug. 23, 1898.
L. H. KROMM.
FERTILIZER DISTRIBUTER.
(Application filed June 1, 1897.)
(No Model.) 3 Sheets—Sheet 3.
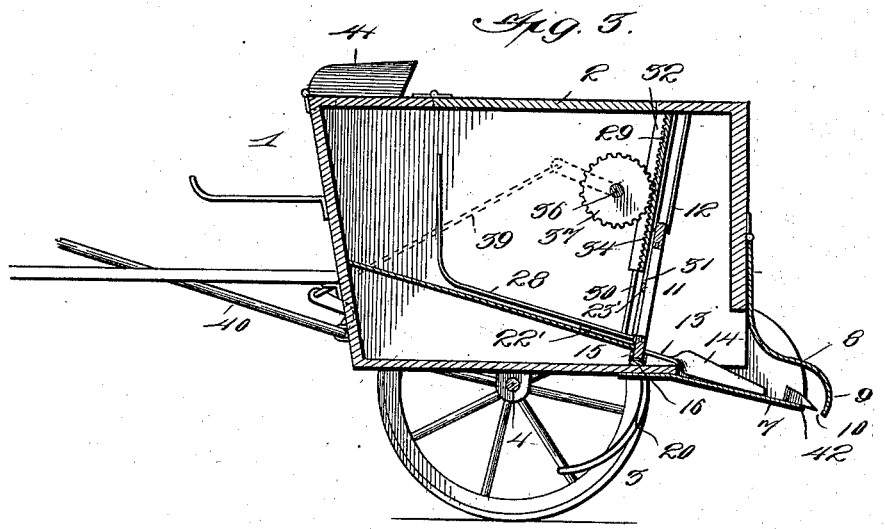
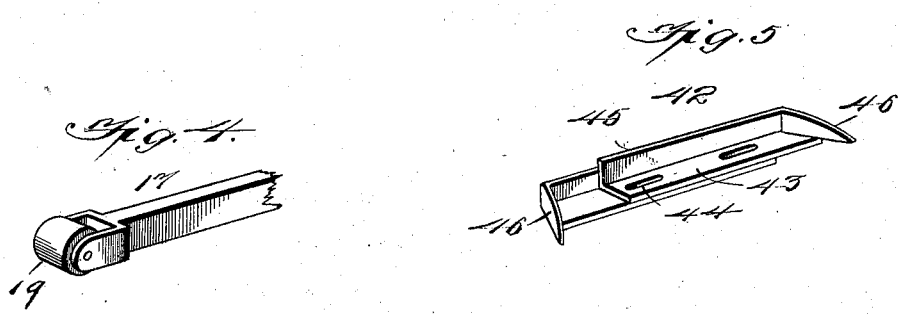
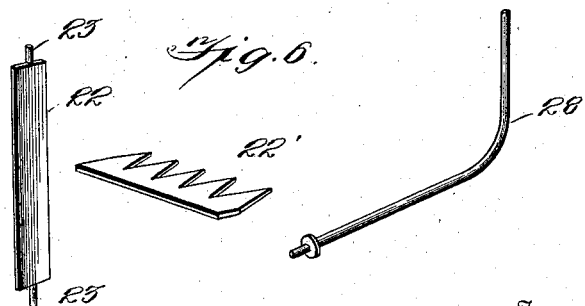
Witnesses
Inventor
Louis H. Kromm,
By John Wedderburn, Attorney

UNITED STATES PATENT OFFICE.

LOUIS H. KROMM, OF BALTIMORE, MARYLAND.

FERTILIZER-DISTRIBUTER.

SPECIFICATION forming part of Letters Patent No. 609,440, dated August 23, 1898.

Application filed June 1, 1897. Serial No. 638,858. (No model.)

*To all whom it may concern:*

Be it known that I, LOUIS H. KROMM, of Baltimore city, in the State of Maryland, have invented certain new and useful Improvements in Fertilizer-Distributers; and I do hereby declare the following to be a full, clear, and exact description of the invention, such as will enable others skilled in the art to which it appertains to make and use the same.

My invention relates to fertilizer-distributers.

My object is to provide an improved distributer of the class described whereby the fertilizer can be distributed broadcast or in rows, as desirable.

A further object is to provide novel means for regulating the quantity of fertilizer when the same is being distributed, and, further, to provide improved mechanism for cutting or chipping the fertilizer to the proper size for delivery.

Other objects will appear more fully hereinafter.

Having the foregoing objects in view, the invention consists of a fertilizer-distributer of improved construction, as will appear more fully hereinafter, and the novel features thereof will be embodied in the appended claims.

In the accompanying drawings, Figure 1 is a plan section; Fig. 2, a longitudinal section with the regulator raised; Fig. 3, a cross-section taken through one of the racks and gears; Fig. 4, an enlarged perspective detail showing one of the rollers and the end of the shifting bar; Fig. 5, a perspective detail of a pair of convergers, and Fig. 6 a perspective detail of a chipping-blade, a toothed plate, and a beater. Fig. 7 is a perspective view of the chipping or cutting slides with the aperture for attaching to the beating-fingers.

The numeral 1 designates the body of the machine, which constitutes a hopper adapted to contain the fertilizer and has a cover 2. The traction-wheels are shown at 3, the same being journaled on an axle 4, that is journaled in suitable bearings or boxes secured to the body. This axle has suitable collars or sleeves 5 to prevent end thrust thereof. The bottom edge of the hopper inclines toward the rear of the machine to cause the proper gravitation of the fertilizer. At 7 there is shown a delivery-trough onto which the fertilizer passes from the hopper. The numeral 8 designates a hinged cover for this trough, which has a lip 9, separated from the said trough to provide a delivery-mouth 10. Said cover can be thrown back whenever desirable to permit access to the devices to be described later on.

My improved cutting or chipping slide is shown at 11, the same having its upper edge adapted to slide in a guide 12. It is extended rearwardly at 13 and formed into separated rearwardly-extending parallel agitating-fingers 14, adapted to play along the delivery-trough.

The numerals 15 designate rollers carried by the portion 13, which bear against a track 16 and prevent friction.

The numerals 17 and 18 designate arms extending through the sides of the machine-body and in the outer ends of which are journaled rollers 19.

The numerals 20 and 21 designate wire loop carriers strengthened by wire braces 21' and having their ends secured to the respective traction-wheels and which constitute arc-shaped cams adapted to bear against the rollers 19. The loop of one wheel is disposed diametrically opposite that on the other, so that an intermittent reciprocating motion is given to the cutting-slide when the machine is in motion. This cutting-slide has the chippers or blades 22, which are provided with trunnions or journals 23, so that the same can be turned on their longitudinal axes.

The numerals 22' designate toothed plates adapted to be connected to the chippers, and the same are only used when lime is employed with the machine. They are adapted to readily break up the lumps. They can be readily removed, if desirable.

The numeral 23' designates a shifting rod, which is suitably connected to the free edges of the blades and centrally of the height thereof, and the same is provided with a plurality of openings at one end and is bifurcated at its other end, the members of the bifurcated portion being provided with openings 26. Clamping bolts and nuts are shown at 27, the shanks of the bolts passing through the openings of the shifting bar. It will be seen, therefore, that the bolts can be removed, the bar shifted, and the said bolts replaced in either opening of said bar, so that provision is made for holding the chippers or blades as far open as desirable.

I employ curved beating-fingers 28, which are screwed into the lower bar of the frame and the chipper-slide intermediate the blades and project into the fertilizer, so as to be adapted to beat or agitate the same and break it up into the proper size. Of course if lime is used these fingers will have to be removed, as they are liable to become broken. This is the reason why they are detachably connected to the frame.

There is a regulator-slide 29, which has its ends received in guide 30, located within the hopper, and its central portion bearing against a strip 31. Near the ends of this slide, which is adapted to move vertically adjacent the cutting or chipping slide, are located guides 32 and 33, between which are disposed racks 34 and 35.

The numeral 36 designates a shaft journaled in the body of the machine, and 37 and 38 are gears carried thereby and adapted to mesh with the rack and located between the guides aforesaid. Shifting mechanism 39 is employed for turning this shaft and is operated by a lever 40, located in suitable proximity to the driver's seat 41. When the lever is moved, the slide will be raised or lowered, as the case may be, and thus the proper feed to the cutting-slide can be had. Of course this regulating-slide is disposed at a suitable distance from the cutting-slide, so as to prevent any contact therewith after adjustment of the cutters or chippers.

The machine as described is adapted for use as a broadcast distributer, and when the same is to be employed as a row distributer I employ convergers 42. These are made of sheet metal, having bases 43, provided with slots 44 and upright portions 45, which are turned over, providing inclined lips 46. Bolts or thumb-nuts 47 are employed for securing these convergers to the delivery-trough. In the present instance there are employed four or more of said convergers, providing three delivery-mouths, (shown at 48.) The end convergers are not adapted for adjustment; but the remaining convergers are disposed in pairs fitted into and upon each other, as shown, and the bolts pass through the slots of each pair. It will be seen, therefore, that these intermediate convergers can be shifted as desired, so that the width of the delivery-mouths can be varied as desirable.

The operation is as follows: The fertilizer in the hopper gravitates down to the regulator-slide. When this slide is shifted, the fertilizer passes onto the cutting-slide, by means of which it is chipped or broken into proper size, having been previously stirred by the beating-fingers, and then onto the delivery-trough, where the movement of the chipping-fingers causes it to scatter broadcast. The lip of the hinged cover causes the fertilizer to be delivered in a narrow sheet, so that the best effect can be had. Of course if it is desirable to fertilize in rows the convergers are employed, and the chipping-fingers then direct the fertilizer in between said convergers, and three separate streams of fertilizer issue from the machine.

It will be understood from my previous description that the cam-loops and the rollers cause the reciprocation of the cutting-slide. As before stated, the cutters can be moved to give any desired amount of opening between them, according to the fertilizer which is employed. If lime is used, the beating-fingers are removed and the toothed plates applied, so that the said fertilizer will be properly broken up.

It is to be understood that various changes could be resorted to by a skilled mechanic in carrying out my ideas without detracting from any of the advantages of the invention, and hence I reserve the right to make all such changes as properly come within the spirit and scope of the invention.

Having thus described my invention, what I claim as new, and desire to secure by Letters Patent, is—

1. In a device of the class described, the combination with a hopper having a delivery-mouth, of a cutting or chipping slide movable in said mouth and comprising a frame, cutting-blades journaled thereto, and means for shifting said blades to regulate the amount of opening therebetween, and means for moving said chipping-slide.

2. In a device of the class described, the combination with a hopper having a delivery-mouth, of a chipping or cutting slide movable in said mouth and comprising a frame, cutting-blades or chippers journaled in said frame, a shifting-bar pivoted to said blades, adjustable connections between said bar and the frame whereby the same may be held rigid, and means for moving said chipping or cutting slide.

3. In a device of the class described, the combination with a hopper and a delivery-trough, of a cover hinged to the hopper and provided with a bent lip separated from the trough thereby providing an elongated delivery-mouth, and agitators adapted to travel along said trough.

In testimony whereof I have signed this specification in the presence of two subscribing witnesses.

LOUIS H. KROMM.

Witnesses:
WM. N. CROMWELL,
GEO. R. HAMLIN.